United States Patent
Cogan et al.

[11] Patent Number: 5,134,802
[45] Date of Patent: Aug. 4, 1992

[54] INSECT TRAP

[75] Inventors: Paul M. Cogan, Uxbridge; David B. Pinniger, Cookham, both of England

[73] Assignee: The Minister for Agriculture, Fisheries and Food, London, England

[21] Appl. No.: 592,046

[22] Filed: Oct. 4, 1990

[30] Foreign Application Priority Data

Oct. 9, 1989 [GB] United Kingdom ............... 8922679

[51] Int. Cl.⁵ .............................................. A01M 1/20
[52] U.S. Cl. ......................................... 43/107; 43/121
[58] Field of Search ................ 43/107, 131, 121, 108, 43/109

[56] References Cited

U.S. PATENT DOCUMENTS

| | | | |
|---|---|---|---|
| 1,139,717 | 5/1915 | Pipenhagen | 43/121 |
| 1,867,252 | 7/1932 | Crigler | 43/121 |
| 1,919,916 | 7/1933 | Taylor | 43/107 |
| 2,193,492 | 3/1940 | Richardson | 43/107 |
| 2,997,806 | 8/1961 | Duvall | 43/121 |
| 4,030,233 | 6/1977 | Wunsche | 43/121 |
| 4,890,416 | 1/1990 | Roberts | 43/131 |
| 5,005,416 | 4/1991 | Vick et al. | 43/121 |

OTHER PUBLICATIONS

Loschiaro & Atkinson, 1973, "An Improved Trap to Detect Beetles (Coleoptera) in Stored Grain" Can. Ent. 105: 437-440.
Barak & Harein, 1982, "Trap Detection of Stored-Grain Insects in Farm-Stored, Shelled Corn" J. Econ. Entomol. 75: 108-111.
Harein and Cutkomp, 1989, "Field Tests with probe Traps for Sampling Adult Insects Infesting Farm Stored Grain", J. Agric. Ent. 6(1): 9-21.

Primary Examiner—Richard K. Seidel
Assistant Examiner—James Miner
Attorney, Agent, or Firm—Nixon & Vanderhye

[57] ABSTRACT

An insect trap has a base (10), defining a pitfall chamber, of a suitable shape (such as conical) which will allow the trap to be easily inserted into a bulk granular material. A removable lid (20), preferably of a shape (such as domed) which will allow the trap to be easily withdrawn from within the bulk granular material. Holes (30) in the lid are of a size such as will allow ingress of insects but not of grain. Slippery rings and flanges are provided for preventing insects from escaping from within the chamber.

11 Claims, 2 Drawing Sheets

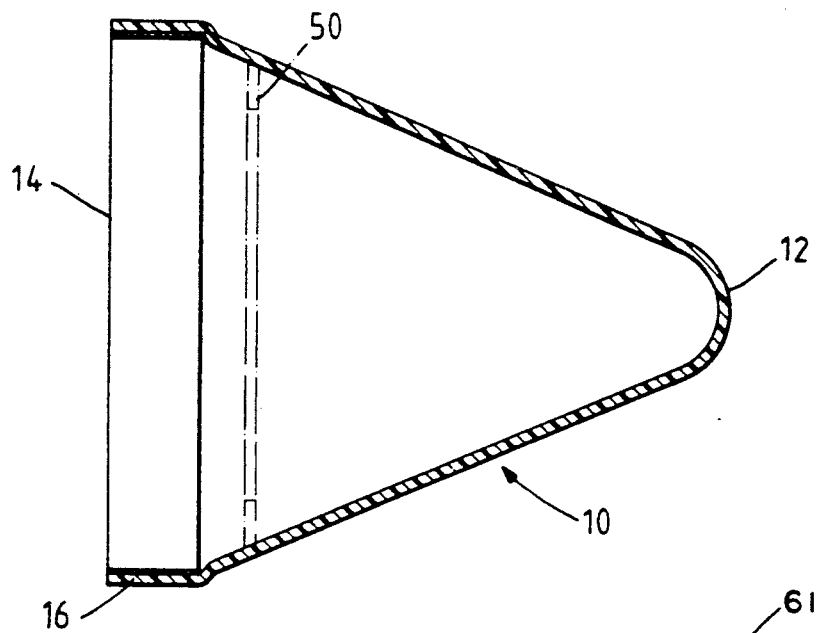
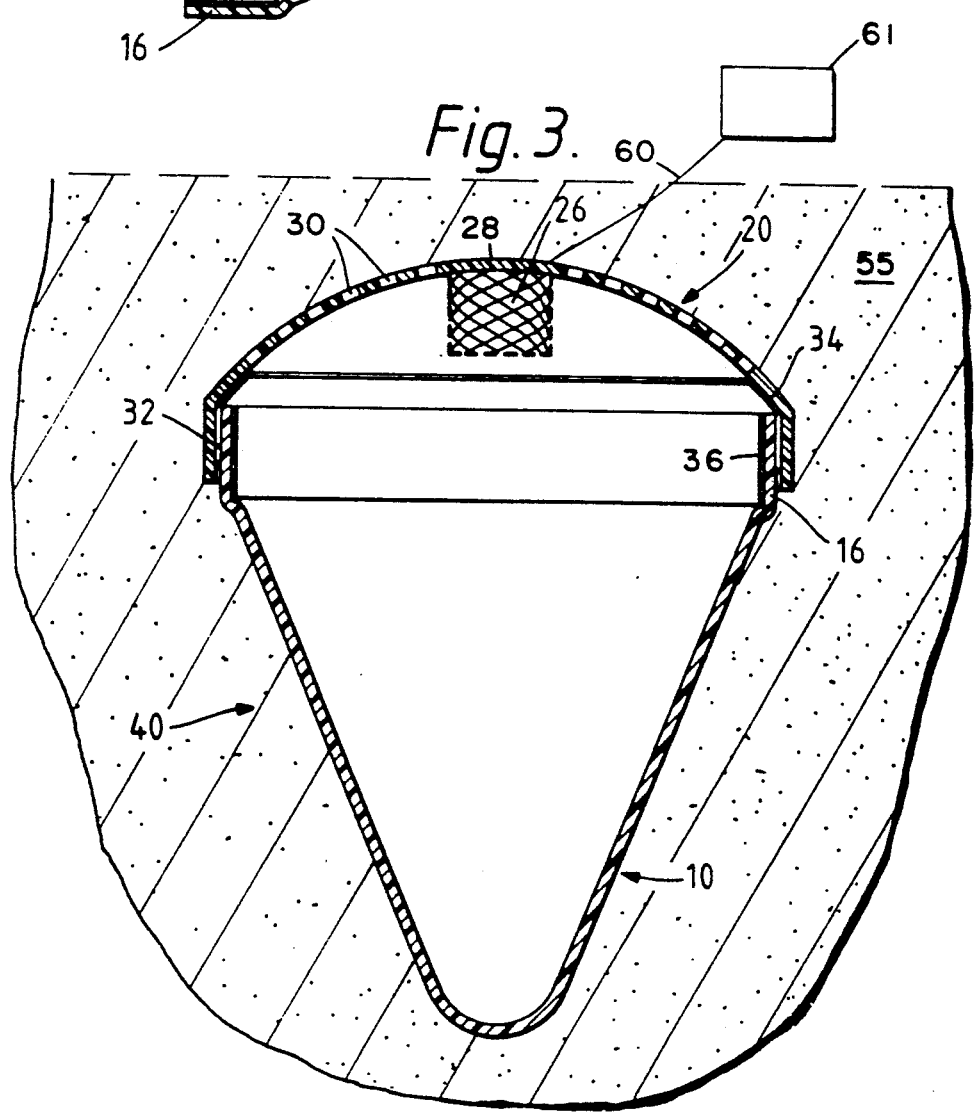

INSECT TRAP

BACKGROUND OF THE INVENTION

1. Field of the Invention

This invention relates to an insect trap, in particular to a pitfall fall cone trap for insects in grain and other granular bulk materials.

2. Discussion of Prior Art

There are various types of insect trap currently in use. For example UK Patent 1,598,010 describes a trap in the form of a rectangular box having apertures which allow entry of the insects containing trays holding bait, and which has a space wherein insects can be trapped or killed by the presence of, for example, paraffin. Whilst this trap could be used with a granular bulk material it would have to be buried therein to leave its top (in which are the apertures) level with the material surfaces. This would be a work intensive process, in view of the shape of the trap.

In another form of trap, described in U.S. Pat. No. 4,581,845 a shallow pitfall chamber containing oil is positioned in a wafer formation formed by folding up a segmented sheet of material which is plain on one side and corrugated on the other side. Some of the segments have apertures therein to hold the pitfall chamber, and a top segment covers the chamber. Insects gain access to the trap (which may hold a lure) through the channels formed by the corrugations, and eventually reach the pitfall. This type of trap can be positioned on top of a bulk granular material, but is unsuitable for use within the bulk, where the channels would be blocked by grains.

Another type of trap is a surface beaker type which is unlidded, whilst yet another is a rod-like insect probe trap which may be inserted into the grain. The former of these can only be used at the surface and the latter only below the surface of the grain and neither can operate in place of the other.

SUMMARY OF THE INVENTION

There is therefore a need for an insect trap that can operate both at the surface and below the surface in a bulk granular material.

According to the present invention there is provided an insect trap, for use in or at the surface of granular bulk material, which includes a base defining a pitfall chamber of a shape such as to allow easy insertion into the granular bulk and a removable perforated lid wherein holes in the lid are of a diameter and spacing such as to allow the entry of insects into the pitfall chamber but exclude granular bulk from entering, there being means within the chamber for preventing insects from escaping therefrom.

The trap is therefore suitable for use either at the surface or below the surface in a granular bulk material.

The means for preventing insects from escaping from the chamber may include a ring of slippery material such as polytetrafluoroethylene (PTFE) on an internal surface of the base, of the lid, or of both base and lid, or may be an annular flange extending from the internal surface of the base or of the lid.

The lid of the trap is preferably dome-shaped and preferably designed so as to fit onto the base of the trap such that when the trap is pulled out of the granular bulk the base and lid of the trap do not become disconnected. A screw attachment may be used when the base and the lid join at a circular section. Alternatively the base and lid may be connected by push fit means.

Advantageously, the trap further includes an insect lure, which may be attached to the underside of a central boss of the lid or may be placed in the base of the trap.

The trap is preferably formed from injection moulded styrene.

The lid and base of the trap are preferably designed so that the trap can be withdrawn from the grain bulk by means of a lead attached to the lid which also provides means by which buried traps can be marked, for example with flags or tags, to ensure recovery.

BRIEF DESCRIPTION OF THE DRAWINGS

The invention will now be described, by way of example, with reference to the accompanying drawings in which:

FIG. 1 is a side elevation in section of the body of the trap;

FIG. 3 is a side view in section of the assembled trap.

DETAILED DESCRIPTION OF PREFERRED EMBODIMENTS

Figure 2A:
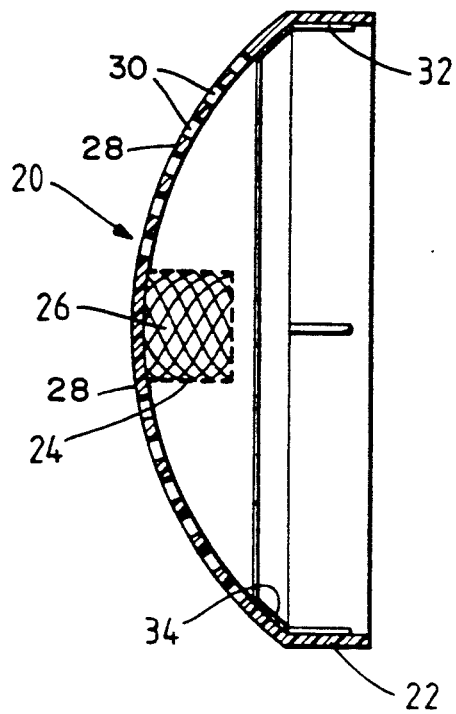
FIG. 2a is a side elevation in section of the lid of the trap.
Figure 2B:
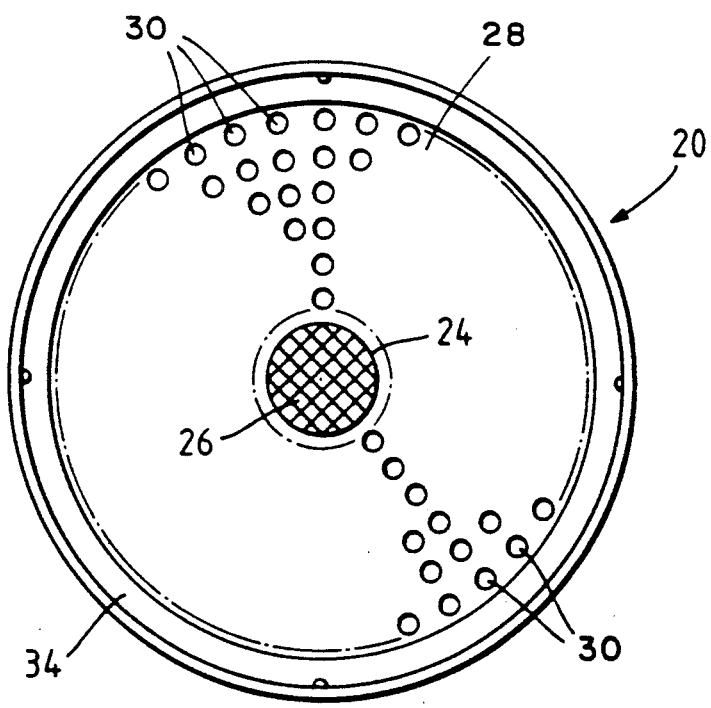
FIG. 2b is a plan view of the lid.

A pitfall cone trap comprises a base 10 (FIG. 1) and a lid 20, (FIGS. 2a & 2b). The base 10 is substantially a truncated cone sealed at its tapered end 12 and open at an end 14 remote from the tapered end 12, where the base has a first 'rim' substantially cyclindrical in shape. The lid 20 is substantially dome-shaped but also has a second 'rim' 22 substantially cylindrical in shape. The central boss 24 of the lid 20 houses an insect lure 26 and the rest of the domed surface 28 is perforated with holes 30. The 'rim' 22 of the lid 20 preferably has a plurality of ribs 32 on its inside surface. The lid 20 has on its inside surface a ring 34 of polytetrafluoroethylene (PFTE). Base 10 also has the inside surface of rim 16 lined with a ring of PTFE.

To assemble the trap the lid 20 is placed onto the base 10 such that the second rim 22 of the lid 20 fits over the first rim 16 of the base 10, as shown in FIG. 3. Ribs 32 ensure a snug fit. a lead (not shown) is attached to the lid 20 which provides means by which the trap 40 can be marked, either with flags or tags, to ensure recovery.

Once assembled, the trap 40 may be positioned at the surface of the granular bulk with the base 10 inserted into the grain and the lid 20 at the surface. Insects at the surface of the bulk are lured towards the trap by the insect lure 26. When they start to crawl across the lid 20 they fall through the holes 30 in the lid 20 and fall into the pitfall chamber provided by the base 10. The insects are prevented from escaping from the trap by rings 36 and 34 of PTFE. Alternatively, the trap 40 may be immersed in the granular bulk (as shown at 55 in FIG. 3) below the surface. The conical shape of the base 10 allows easy insertion of the trap into the bulk of grain. The diameter and spacing of the holes 30 in the lid 20 are such that the grains of material are excluded from the trap 40 and only insects fall through into the pitfall chamber 10. Once again, insects in the granular bulk below the surface are lured towards the trap, fall through the holes 30 in the lid 20 and into the pitfall chamber 10.

The trap 40 may be retrieved from the granular bulk by means of a lead 60 attached to the lid 20. The ribs 32 of the lid 20 ensure that the base 10 and lid 20 remain connected when the trap 20 is pulled from the granular bulk. The lead also provides means by which buried traps can be marked, by tags or flags 61 for example.

It will be realised that although the insect trap described has no moving parts, making it easier to manufacture and assemble, the trap may include clips or securing straps in order to keep the lid and the base of the trap firmly connected. It will be further realised that substances other than PTFE may be used in slippery rings to prevent the insects from escaping from the trap. As an alternative to slippery rings, an annular flange such as that shown in dotted lines at 50 in FIG. 1, projecting from the inner surface of the base 10 (as shown), lid 20 or both base 10 and lid 20.

It has been found that, with the design of trap as decribed with reference to FIG. 1 to 3, during removal of the trap from a granular bulk by means of a lead attached to the lid 20 the second rim 22 is caused to contract onto the first rim 16, thus tending to prevent separation of base 10 and lid 20. In embodiments of the invention having a lid 20 of flat configuration, and if it is desired to avoid the use of moving parts such as clips or straps, screw fitting means might be associated with the rims 16, 22.

What is claimed is:

1. An insect trap, for use in conjunction with a granular bulk medium, for trapping insects on and below the surface of said granular medium, said insect trap comprising:
   a base, said base including a pitfall chamber, said chamber having a substantially conical shape, said shape comprising a means for easing insertion of said trap into said granular medium;
   a lid, said lid including push fit means for removably attaching said lid to said base, said lid perforated with holes of a diameter and spacing so as to allow entry of insects into the pitfall chamber, said base and said lid comprising means for excluding said granular medium from said pitfall chamber, said lid having a substantially outward domed shape; and
   means for preventing insects from escaping from said pitfall chamber.

2. An insect trap as claimed in claim 1 wherein the means for preventing the insects from escaping includes at least one ring of slippery material.

3. An insect trap as claimed in claim 2 having a ring of slippery material on an internal surface of the base.

4. An insect trap as claimed in claim 2 having a ring of slippery material on an internal surface of the lid.

5. An insect trap as claimed in claim 2 wherein the slippery material is PTFE.

6. An insect trap as claimed in claim 1 wherein the means for preventing the insects from escaping from the chamber includes an annular flange projecting from one internal surface of the chamber.

7. An insect trap as claimed in claim 1 wherein the base of the trap includes a first rim and the lid of the trap includes a second rim and the trap is assembled such that the second rim of the lid fits over the first rim of the base.

8. An insect trap as claimed in claim 7 wherein the inside surface of the second rim of the lid includes a plurality of ribs to ensure a snug fit of the lid to the base.

9. An insect trap as claimed in claim 1 wherein the trap further includes an insect lure.

10. An insect trap as claimed in claim 1 wherein the trap is formed from injection moulded styrene.

11. An insect trap as claimed in claim 1 wherein a lead is attached to the lid of the trap wherein flags or tags are attached to the lead to provide means by which buried traps can be marked.

* * * * *